(12) United States Patent
Lee

(10) Patent No.: US 7,644,936 B2
(45) Date of Patent: Jan. 12, 2010

(54) CASTER CONTROL APPARATUS

(75) Inventor: Dong-Ho Lee, Busan (KR)

(73) Assignee: Hyundai Motor Company, Seoul (KR)

( * ) Notice: Subject to any disclaimer, the term of this patent is extended or adjusted under 35 U.S.C. 154(b) by 435 days.

(21) Appl. No.: 11/606,466

(22) Filed: Nov. 29, 2006

(65) Prior Publication Data

US 2007/0132198 A1 Jun. 14, 2007

(30) Foreign Application Priority Data

Dec. 8, 2005 (KR) .................. 10-2005-0120211

(51) Int. Cl.
*B60G 3/26* (2006.01)
(52) U.S. Cl. .................................. 280/5.521
(58) Field of Classification Search .......... 280/5.52, 280/5.521, 86.751, 124.112
See application file for complete search history.

(56) References Cited

U.S. PATENT DOCUMENTS 5,481,458 A * 1/1996 Harara et al. ................. 701/37

FOREIGN PATENT DOCUMENTS

| JP | 05-213030 | 8/1993 |
| JP | 08-067124 | 3/1996 |
| JP | 08-085325 | 4/1996 |

* cited by examiner

*Primary Examiner*—Paul N Dickson
*Assistant Examiner*—Robert A Coker
(74) *Attorney, Agent, or Firm*—Edwards Angell Palmer & Dodge LLP; Peter F. Corless; Kongsik Kim

(57) ABSTRACT

Disclosed is a caster control apparatus for a suspension of a vehicle. When the vehicle travels on a road which causes a vehicle body to lean to one side, the caster of a lowered wheel is increased, and the caster of a raised wheel is decreased, such that the casters of the wheels on both sides are offset with each other. Therefore, the vehicle is inhibited from leaning due to the lateral slope of the road, and the straight-line stability of the vehicle can be reliably maintained.

10 Claims, 3 Drawing Sheets

CASTER CONTROL APPARATUS

CROSS-REFERENCE TO RELATED APPLICATIONS

The present application is based on, and claims priority from, Korean Application Serial Number 10-2005-0120211, filed on Dec. 8, 2005, the disclosure of which is hereby incorporated by reference herein in its entirety.

FIELD OF THE INVENTION

The present invention relates in preferred aspects to a caster control apparatus for the suspension of a vehicle, which can prevent a vehicle from leaning to one side due to the lateral slope of a road while traveling on the road, and can reliably maintain straight-line stability.

BACKGROUND OF THE INVENTION

As is well known in the art, the suspension of a vehicle comprises a lower arm which is coupled to a knuckle supporting a wheel, and an upper arm which is formed to be positioned above the lower arm and connects the upper portion of the knuckle to a vehicle body to support the knuckle.

The lower arm and the upper arm are fastened to the vehicle body via bushings, and one end of each of the lower and upper arms is coupled to the knuckle by a ball joint.

Depending upon the position of the ball joint, a caster is provided to the wheel. The caster is regarded as an important factor assuring the returnability of the wheel while a vehicle travels on a road.

Meanwhile, if a difference in height exists between the left side and the right side of a vehicle due to the lateral slope of a road on which the vehicle travels, the vehicle leans to one side. This leaning phenomenon of a vehicle serves as a cause of deteriorating the straight-line stability of the vehicle.

The lateral slope of a road, which causes the vehicle to lean, is inevitable due to road conditions.

If the casters of wheels on both sides are properly adjusted, the leaning phenomenon due to the lateral slope of a road can be prevented. However, in view of the existing structures of vehicles, the casters of wheels on both sides cannot be appropriately adjusted while the vehicle is traveling on the road, so it is not possible to actively respond to the leaning phenomenon of the vehicle caused due to the lateral slope of a road.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, a caster control apparatus for the suspension of a vehicle is provided. Preferred systems can actively control the casters of wheels on both sides when a possibility exists of the vehicle leaning to one side due to the lateral slope of a road, thereby offsetting the casters of wheels on both sides, so that the vehicle is prevented or inhibited from leaning due to the lateral slope of the road while traveling on the road, and the straight-line stability of the vehicle can be reliably maintained.

In one aspect, a caster control apparatus for a suspension of a vehicle is provided comprising left and right joint apparatus provided to a lower arm to respectively connect left and right wheels to the lower arm, a stud member fastened to a wheel; stud forward and rearward moving apparatus to move the stud member; and stud movement control apparatus to adjust for a tilted state of the vehicle.

In a particularly preferred system, a caster control apparatus for a suspension of a vehicle of the present invention comprises left and right ball joint means provided to a lower arm to respectively connect left and right wheels to the lower arm, and each having a ball joint housing, a ball member installed in the ball joint housing and a stud member which has one end rotatably coupled to the ball member and the other end fastened to the corresponding wheel. Stud forward and rearward moving means are suitably provided to each of the left and right ball joint means to linearly move the stud member coupled to the ball member forwards and rearwards. Stud movement control means preferably is interconnected with the stud forward and rearward moving means to sense the tilted state of the vehicle and linearly move the left ball joint means and the right ball joint means in opposite directions in conformity with the tilted state of the vehicle.

Upon use of preferred systems, when a vehicle travels on a road having a lateral slope, the tilted angle of the vehicle is sensed or detected by stud movement control means. Then, when the left wheel is raised, the stud member of the left ball joint means is moved rearward by stud forward and rearward moving means, and the stud member of the right ball joint means is moved forward by the stud forward and rearward moving means, to adjust a right caster to be greater than a left caster, whereby it is possible to maintain the straight-line stability of the vehicle.

In another aspect, motor vehicles are provided that comprise a described a caster control apparatus.

It is understood that the term "vehicle" or other similar term as used herein is inclusive of motor vehicles in general such as passenger automobiles, buses, trucks, various commercial vehicles, and the like.

Other aspects of the invention are discussed infra.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
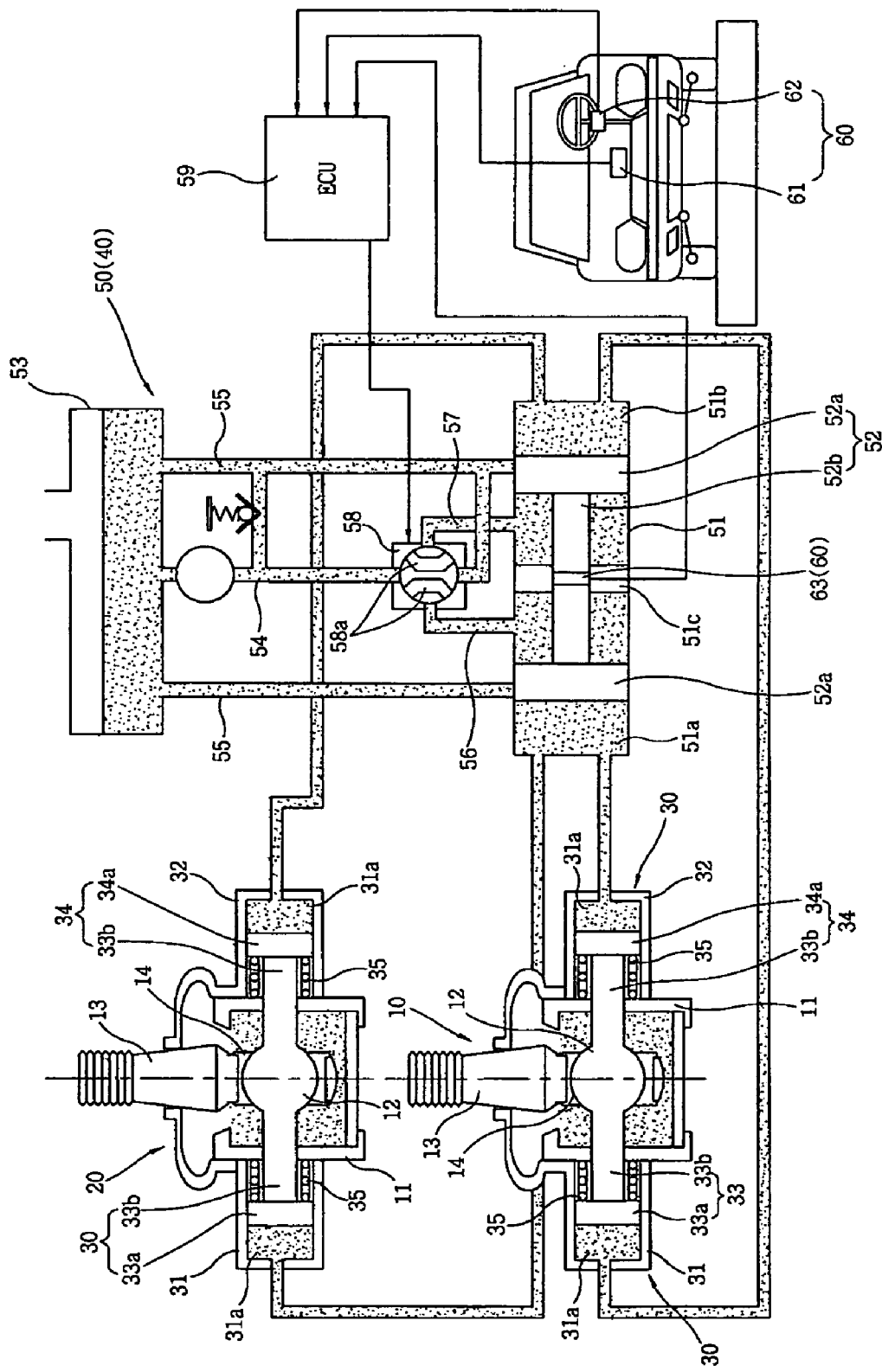
FIG. 1 is a systematic view illustrating a caster control apparatus for the suspension of a vehicle in accordance with an embodiment of the present invention.

As discussed above, in one preferred aspect, a caster control apparatus is provided comprising: left and right joint apparatus provided to a lower arm to respectively connect left and right wheels to the lower arm, a stud member fastened to a wheel; stud forward and rearward moving apparatus to move the stud member; and stud movement control apparatus to adjust for a tilted state of the vehicle.

The stud forward and rearward moving apparatus may suitably comprise front and rear cylinders; a front piston member inserted into a front cylinder, and having a piston which is formed on a distal end thereof to be moved on an inner surface of the front cylinder; and a rear piston member inserted into a rear cylinder.

The stud movement control apparatus may suitably comprise a hydraulic circuit, e.g., where the hydraulic circuit adjusts pressure of fluid charged in the front and rear cylinders to control movement of the stud members.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 is a systematic view illustrating a caster control apparatus for the suspension of a vehicle in accordance with an embodiment of the present invention. FIG. 1 illustrates a state wherein a vehicle travels on a road having a normal lateral slope range of no greater than 1%, and left and right ball joint means are in a neutral position.

Figure 2:
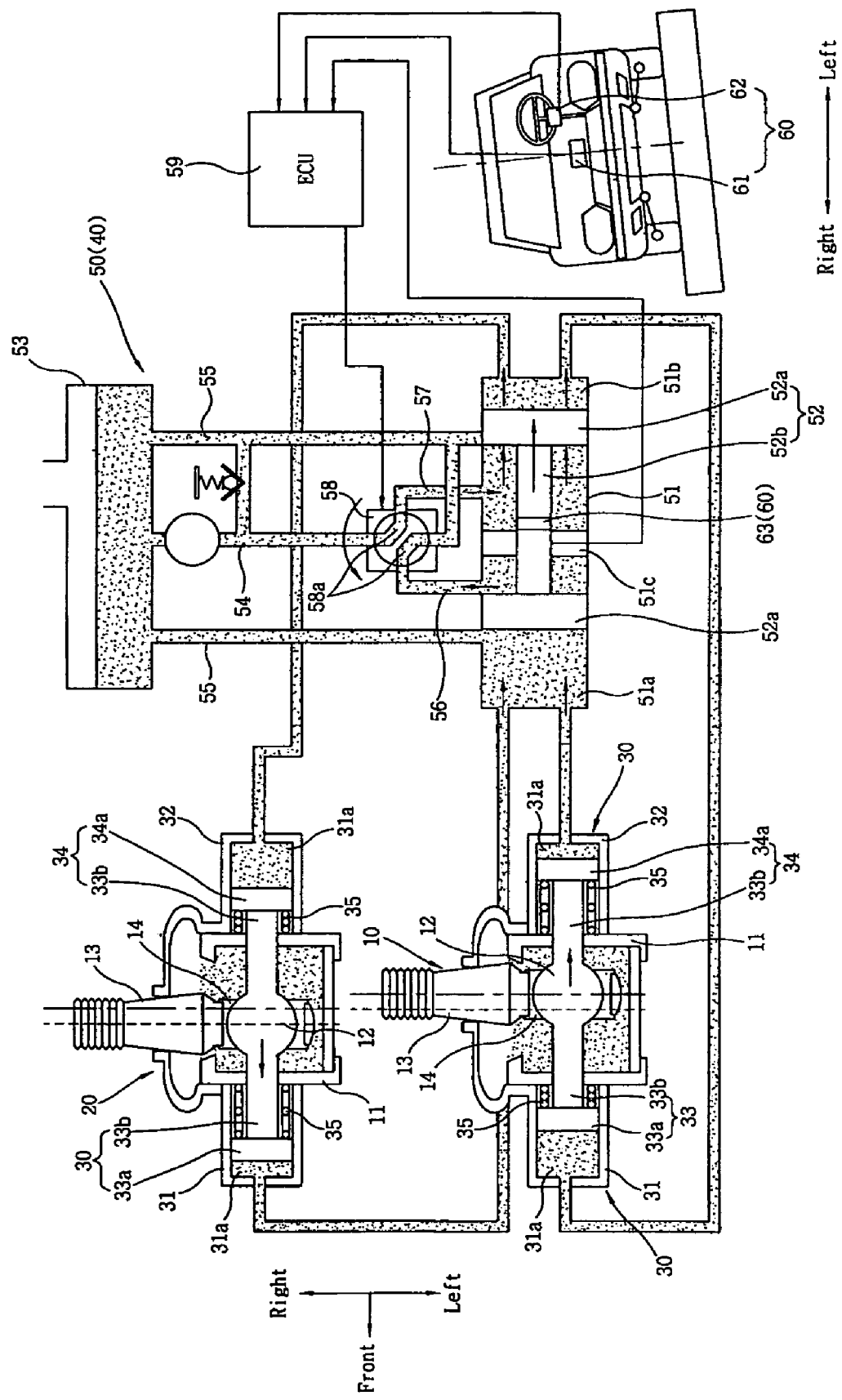
FIGS. 2 and 3 are systematic views illustrating the in-use states of the caster control apparatus for the suspension of a vehicle in accordance with the embodiment of the present invention.
Figure 3:
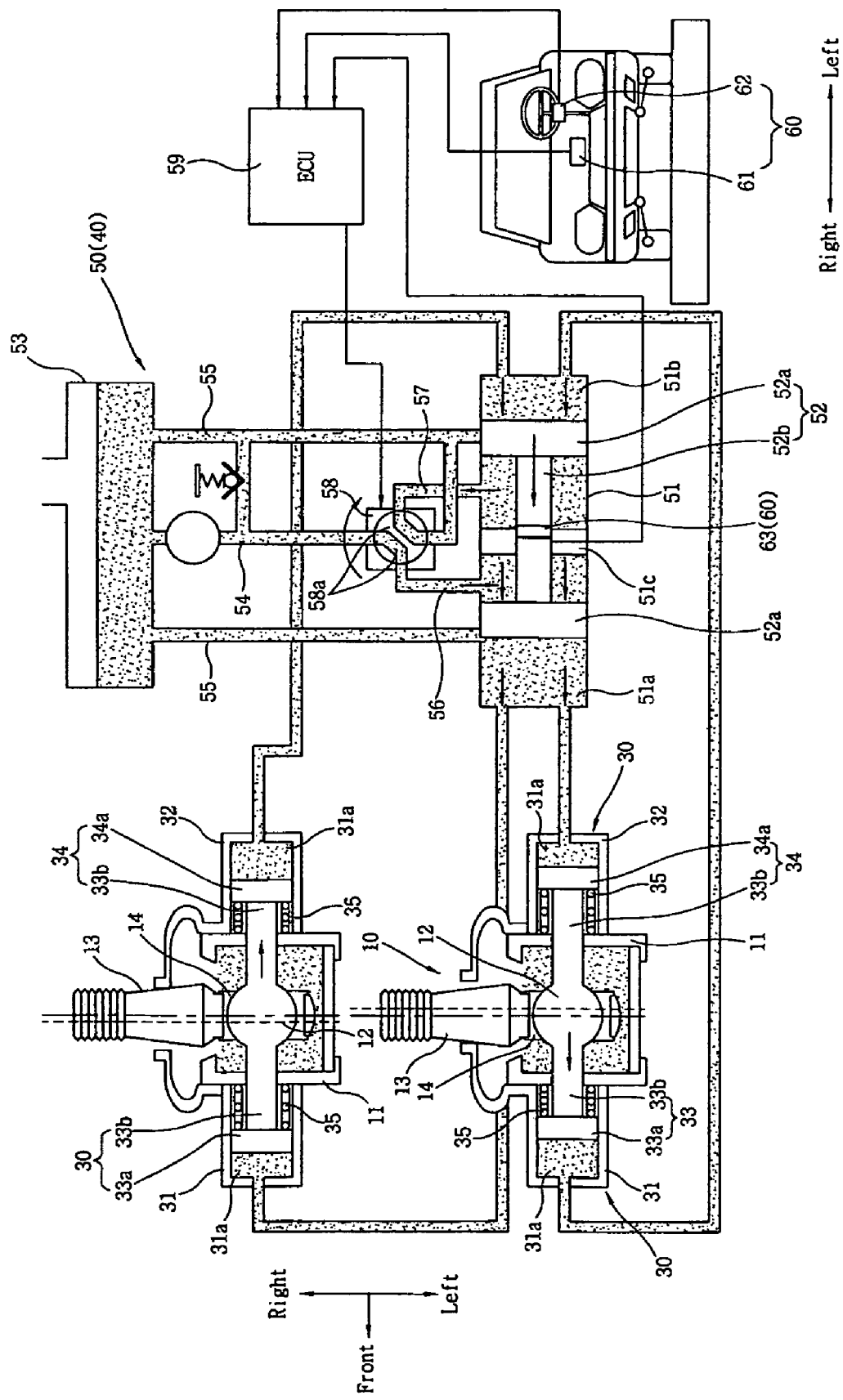

FIGS. 2 and 3 are systematic views illustrating use of a caster control apparatus for the suspension of a vehicle in accordance with an exemplary embodiment of the present invention. FIG. 2 illustrates a state wherein a vehicle travels on a road having an abnormal lateral slope range of greater than 1%, specifically, a rightward sloped road condition in which the left wheel is raised, and the left ball joint means is moved rearward and the right ball joint means is moved forward. FIG. 3 illustrates a state wherein a vehicle enters again a normal lateral slope range of no greater than 1% after traveling under the rightward sloped road condition as shown in FIG. 2, and the left and right ball joint means are returned to the neutral position.

Referring to FIG. 1, the caster control apparatus for the suspension of a vehicle in accordance with the embodiment of the present invention suitably comprises left and right ball joint means 10 and 20. The left and right ball joint means 10 and 20 can function to connect left and right wheels of the vehicle to the lower arm of the suspension. Each of the left and right ball joint means 10 and 20 suitably has a ball joint housing 11 which is integrally formed with the lower arm. The ball joint housing 11 suitably defines a space into which a ball member 12 is inserted and which is filled with grease 11a.

The ball member 12 inserted into the ball joint housing 11 suitably has a spherical shape. The other end of a stud member 13, having one end formed as a bolt to be locked to a knuckle for the wheel, is suitably rotatably ball-jointed to the ball member 12.

Therefore, the stud member 13 is suitably pivotably coupled to the ball member 12. The rotation angle of the stud member 13 is suitably established such that the rotation of the stud member 13 is not interfered with by the piston rods 33b and 34b, which project from both sides of the ball member 12.

A bearing member 14 is suitably interposed between the stud member 13 and the ball member 12 so that the stud member 13 can smoothly pivot about the ball member 12.

Each of the left and right ball joint means 10 and 20 preferably comprises stud forward and rearward moving means 30 which linearly move the stud member 13, ball-jointed to the ball member 12, forwards and rearwards.

The stud forward and rearward moving means 30 suitably comprises front and rear cylinders 31 and 32 respectively provided on both sides of the ball joint housing 11; a front piston member 33 projecting from one side of the ball member 12, inserted into the front cylinder 31, and having a piston 33a which is formed on the distal end thereof to be moved on the inner surface of the front cylinder 31; a rear piston member 34 projecting from the other side of the ball member 12, inserted into the rear cylinder 32, and having a piston 34a which is formed on the distal end thereof to be moved on the inner surface of the rear cylinder 32; and return spring members 35 disposed in the front and rear cylinders 31 and 32 to elastically support the front and rear piston members 33 and 34.

The front and rear cylinders 31 and 32 preferably are respectively installed on the front and rear walls of the ball joint housing 11 and define cylinder chambers 31a in which the pistons 33a and 34a are disposed to be linearly moved on the inner surfaces of the front and rear cylinders 31 and 32.

The front and rear piston members 33 and 34 suitably comprise piston rods 33b and 34b having proximal ends which are coupled to both sides of the ball member 12 and distal ends which are inserted into the front and rear cylinders 31 and 32, and the pistons 33a and 34a formed on the distal ends of the piston rods 33b and 34b to be moved on the inner surfaces of the front and rear cylinders 31 and 32.

The front and rear cylinders 31 and 32 are suitably connected to a hydraulic circuit 50 as will be described later, and oil is charged in the cylinder chambers 31a which are defined by the pistons 33a and 34a of the front and rear piston members 33 and 34.

The return spring members 35 are suitably disposed in the other chambers which are defined by the pistons 33a and 34a of the front and rear piston members 33 and 34 and are not filled with oil.

The return spring members 35 preferably elastically support the front and rear piston members 33 and 34 in order to ensure that the ball member 12 is centrally positioned in the ball joint housing 11 when the vehicle travels on a road having a lateral slope within a normal range.

Stud movement control means 40 is suitably interconnected with the stud forward and rearward moving means 30 to control the stud forward and rearward moving means 30 such that the stud members 13 of the left and right ball joint means 30 are moved in opposite directions. The stud movement control means 40 preferably can sense the tilt angle of the vehicle and controls the stud forward and rearward moving means 30 such that, when the left wheel is raised, the stud member 13 of the left ball joint means 10 is moved rearwards by the stud forward and rearward moving means 30, and the stud member 13 of the right ball joint means 20 is moved forwards by the stud forward and rearward moving means 30.

That is to say, in the case where the vehicle leans to one side due to the lateral slope of a road so that the left side of the vehicle is raised, the stud movement control means 40 can control the stud forward and rearward moving means 30 such that the stud member 13 of the left ball joint means 10 is moved rearwards to decrease the caster of the left wheel, and the stud member 13 of the right ball joint means 20 is suitably moved forwards to increase the caster of the right wheel. In this way, by actively controlling the casters of the respective wheels, it is possible to reliably maintain the straight-line stability of the vehicle.

Meanwhile, in this embodiment, the stud movement control means 40 suitably comprises the hydraulic circuit 50, which adjusts the pressure of fluid filled in the front and rear cylinders 31 and 32 to control the movement of the stud members 13.

The hydraulic circuit 50 suitably comprises a master cylinder 51 divided by a partition 51c into a first control cylinder chamber 51a which is connected to the rear cylinder 32 of the left ball joint means 10 and the front cylinder 31 of the right ball joint means 20 and a second control cylinder chamber 51b which is connected to the front cylinder 31 of the left ball joint means 10 and the rear cylinder 32 of the right ball joint means 20; a master piston member 52 having a master piston rod 52b which extends through the partition 51c of the master cylinder 51 and master pistons 52a which are formed on both ends of the master piston rod 52b to be moved on the inner surfaces of the first and second control cylinder chambers 51a and 51b; a fluid reservoir tank 53 connected to the master cylinder 51 and storing fluid which is to be discharged from and supplied to the master cylinder 51; a fluid supply path 54 for supplying fluid stored in the fluid reservoir tank 53 to the master cylinder 51 and having a pump installed thereon; a fluid discharge path 55 for discharging fluid from the master cylinder 51 to the fluid reservoir tank 53; a first fluid supply and discharge path 56 selectively connected to the fluid supply path 54 or the fluid discharge path 55 and connected to the front control cylinder of the master cylinder 51 to supply or discharge fluid into or from the first control cylinder chamber 51a; a second fluid supply and discharge path 57 selectively connected to the fluid supply path 54 or the fluid discharge path 55 and connected to the rear control cylinder of the master cylinder 51 to supply or discharge fluid into or from the second control cylinder chamber 51b; a fluid path change valve 58 installed on the first and second fluid supply and discharge paths 56 and 57, having fluid connection paths 58a for selectively connecting the first and second fluid supply and discharge paths 56 and 57 to the fluid supply path 54 and the fluid discharge path 55, and operated by a step motor; and an ECU 59 including a sensor unit 60 for sensing the tilted state of the vehicle to control the fluid path change valve 58 in response to a signal from the sensor unit 60 and to thereby selectively connect the first and second fluid supply and discharge paths 56 and 57 to the fluid supply path 54 and the fluid discharge path 55.

The sensor unit 60 of the ECU 59 preferably comprises a tilt sensor 61 mounted to a vehicle body to sense the leftward or rightward tilt of the vehicle body; a steering angle sensor 62 mounted to a steering system to sense when the vehicle is being driven straight; and a neutral switch sensor 63 mounted to the master piston member 52 to sense whether the master piston member 52 is in a neutral position.

The tilt sensor 61 preferably can sense the lateral slope of a road. If a vehicle travels on a road having a normal lateral slope range of no greater than 1% (corresponding to about 0.6°, the fluid connection paths 58a of the fluid path change valve 58 do not connect the first and second fluid supply and discharge paths 56 and 57, either to the fluid supply path 54 or to the fluid discharge path 55. This state represents the neutral position, in which the vehicle travels on a road substantially having no lateral slope while maintaining straight-line stability.

Also, if the vehicle travels on a road having an abnormal lateral slope range of greater than 1%, an electric signal from the tilt sensor 61 is suitably transmitted to the ECU 59. Depending upon the tilt direction of the vehicle, the ECU 59 connects the first and second fluid supply and discharge paths 56 and 57 to the fluid supply path 54 and the fluid discharge path 55 via the fluid connection paths 58a of the fluid path change valve 58 to operate the stud forward and rearward moving means 30.

The first and second fluid supply and discharge paths 56 and 57 are connected to the master cylinder 51 such that fluid flow is blocked at the neutral position by the master pistons 52a.

While the hydraulic circuit 50 employs oil as fluid for generating hydraulic pressure, other media can also be used as long as they can generate working pressure.

The use of an exemplary caster control apparatus for the suspension of a vehicle in accordance with the embodiment of the present invention, constructed as mentioned above, will be described below.

While a vehicle travels on a road, if the vehicle enters a road having an abnormal lateral slope range of greater than 1% so that the vehicle leans rightwards and the left side of the vehicle is raised as shown in FIG. 2, the tilt sensor 61 and the steering angle sensor 62 sense this situation and transmit electric signals to the ECU 59.

Then, the ECU 59 suitably rotates the fluid path change valve 58 by the step motor such that the first fluid supply and discharge path 56 is connected to the fluid discharge path 55 and the second fluid supply and discharge path 57 is connected to the fluid supply path 54, via the fluid connection paths 58a.

As the pump installed on the fluid supply path 54 is operated, fluid is suitably supplied into the second control cylinder chamber 51b through the second fluid supply and discharge path 57. Then, as the pressure of fluid in the fluid supply side of the second control cylinder chamber 51b increases, the master piston 52a is pushed to move the master piston member 52.

The fluid, which is pressurized by the master piston member 52 pushed in this way, is suitably supplied into the front cylinder 31 of the left ball joint means 10 and the rear cylinder 32 of the right ball joint means 20.

As the fluid is supplied into the front cylinder 31 of the left ball joint means 10 and the rear cylinder 32 of the right ball joint means 20, the stud member 13 and the ball member 12 of the left ball joint means 10 are suitably moved rearwards by the front piston member 33 and the caster of the left wheel is decreased, and the stud member 13 and the ball member 12 of the right ball joint means 20 are moved forwards by the rear piston member 34 and the caster of the right wheel is increased.

As the front and rear piston members 33 and 34 of the left and right ball joint means 10 and 20 are pushed in this way, the rear and front piston members 34 and 33 of the left and right ball joint means 10 and 20, which are oppositely positioned, suitably compress the fluid filled in the cylinder chambers 31a and supply the fluid into the first control cylinder chamber 51a. Then, as the master piston member 52 is pushed, the fluid filled in the first control cylinder chamber 51a is discharged to the fluid reservoir tank 53 through the first fluid supply and discharge path 56 and the fluid discharge path 55, which are connected with each other by the fluid connection path 58a.

Also, if the vehicle enters again a laterally sloped area in a normal range of no greater than 1%, as shown in FIG. 3 after traveling on a rightward sloped road, in response to a primary signal from the tilt sensor 61, the fluid path change valve 58 is rotated to reversely drive the hydraulic circuit 50 such that the first fluid supply and discharge path 56 is connected to the fluid supply path 54 and the second fluid supply and discharge path 57 is connected to the fluid discharge path 55, via the fluid connection paths 58a.

If the hydraulic circuit 50 is reversed in this way, as the pump installed on the fluid supply path 54 is operated, fluid is suitably supplied into the first control cylinder chamber 51a through the first fluid supply and discharge path 56. Then, as the pressure of fluid in the fluid supply side of the first control cylinder chamber 51a increases, the master piston 52a is pushed to move the master piston member 52.

The fluid which is pressurized by the master piston member 52 pushed in this way is suitably supplied into the rear cylinder 32 of the left ball joint means 10 and the front cylinder 31 of the right ball joint means 20.

As the fluid is supplied into the rear cylinder 32 of the left ball joint means 10 and the front cylinder 31 of the right ball joint means 20, the stud members 13 and the ball members 12 of the left and right ball joint means 10 and 20 are suitably moved forwards and rearwards, respectively, to return to the original neutral position.

As the rear and front piston members 34 and 33 of the left and right ball joint means 10 and 20 are pushed in this way, the front and rear piston members 33 and 34 of the left and right ball joint means 10 and 20, which are preferably oppositely positioned, suitably compress the fluid charged in the front and rear cylinders 31 and 32 and supply the fluid into the second control cylinder chamber 51b. Then, as the master piston member 52 is pushed, the fluid charged in the second control cylinder chamber 51b is discharged to the fluid reservoir tank 53 through the second fluid supply and discharge path 57 and the fluid discharge path 55, which are connected with each other by the fluid connection path 58a.

If the master piston member 52 reaches the neutral position, the stud members 13 of the left and right ball joint means 10 and 20 are suitably returned to their original positions. This situation is sensed by the neutral switch sensor 63, and then the ECU 59 rotates the fluid path change valve 58 such that the fluid connection paths 58a of the fluid path change valve 58 do not connect the first and second fluid supply and discharge paths 56 and 57, either to the fluid supply path 54 or to the fluid discharge path 55, whereby the vehicle is converted into a normal traveling mode.

In the meantime, while a vehicle travels on a road, if the vehicle enters a road having an abnormal lateral slope range of greater than 1%, such that the vehicle leans leftwards and the right side of the vehicle is raised, the tilt sensor 61 and the steering angle sensor 62 sense this situation and transmit electric signals to the ECU 59 such that the caster control apparatus according to the present invention can be operated in the opposite direction.

As is apparent from the above description, the caster control apparatus for the suspension of a vehicle according to the present invention can provide advantages in that, when the vehicle travels on a road which causes a vehicle body to lean to one side, since the caster of a lowered wheel is increased and the caster of a raised wheel is decreased, the casters of the wheels on both sides are offset with each other, so that the vehicle is prevented from leaning due to the lateral slope of the road, and the straight-line stability of the vehicle can be reliably maintained.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A caster control apparatus for a suspension of a vehicle, comprising:
    left and right ball joint means provided to a lower arm to respectively connect left and right wheels to the lower arm, and each having a ball joint housing, a ball member installed in the ball joint housing and a stud member which has one end rotatably coupled to the ball member and the other end fastened to the corresponding wheel;
    stud forward and rearward moving means provided to each of the left and right ball joint means to linearly move the stud member, coupled to the ball member, forwards and rearwards; and
    stud movement control means interconnected with the stud forward and rearward moving means to sense a tilted state of the vehicle and linearly move the left ball joint means and the right ball joint means in opposite directions in conformity with the tilted state of the vehicle.

2. The caster control apparatus as set forth in claim 1, wherein each stud forward and rearward moving means comprises:
    front and rear cylinders respectively provided on both sides of the ball joint housing;
    a front piston member projecting from one side of the ball member, inserted into the front cylinder, and having a piston which is formed on a distal end thereof to be moved on an inner surface of the front cylinder;
    a rear piston member projecting from the other side of the ball member, inserted into the rear cylinder, and having a piston which is formed on a distal end thereof to be moved on an inner surface of the rear cylinder; and
    return spring members disposed in the front and rear cylinders to elastically support the front and rear piston members.

3. The caster control apparatus as set forth in claim 1, wherein the stud movement control means comprises a hydraulic circuit which adjusts pressure of fluid charged in the front and rear cylinders to control movement of the stud members.

4. The caster control apparatus as set forth in claim 3, wherein the hydraulic circuit comprises:
    a master cylinder divided by a partition into a first control cylinder chamber which is connected to the rear cylinder of the left ball joint means and the front cylinder of the right ball joint means and a second control cylinder chamber which is connected to the front cylinder of the left ball joint means and the rear cylinder of the right ball joint means;
    a master piston member having a master piston rod which extends through the partition of the master cylinder and master pistons which are formed on both ends of the master piston rod to be moved on inner surfaces of the first and second control cylinder chambers;
    a fluid reservoir tank connected to the master cylinder and storing fluid which is to be discharged from and supplied to the master cylinder;
    a fluid supply path for supplying fluid stored in the fluid reservoir tank to the master cylinder and having a pump installed thereon;
    a fluid discharge path for discharging fluid from the master cylinder to the fluid reservoir tank;
    a first fluid supply and discharge path selectively connected to the fluid supply path or the fluid discharge path and connected to a front control cylinder of the master cylinder to supply or discharge fluid into or from the first control cylinder chamber;
    a second fluid supply and discharge path selectively connected to the fluid supply path or the fluid discharge path and connected to a rear control cylinder of the master cylinder to supply or discharge fluid into or from the second control cylinder chamber;
    a fluid path change valve installed on the first and second fluid supply and discharge paths, having fluid connection paths for selectively connecting the first and second fluid supply and discharge paths to the fluid supply path and the fluid discharge path; and
    an ECU including a sensor unit for sensing a tilted state of the vehicle to control the fluid path change valve in response to a signal from the sensor unit and to thereby selectively connect the first and second fluid supply and discharge paths to the fluid supply path and the fluid discharge path.

5. The caster control apparatus as set forth in claim 4, wherein the sensor unit of the ECU comprises:
- a tilt sensor mounted to a vehicle body to sense a leftward or rightward tilt of the vehicle body;
- a steering angle sensor mounted to a steering system to sense a straight driving direction of the vehicle; and
- a neutral switch sensor mounted to the master piston member to sense whether the master piston member is in a neutral position.

6. A motor vehicle comprising a caster control apparatus of claim 1.

7. A caster control apparatus for a vehicle, comprising:
- left and right joint apparatus provided to a lower arm to respectively connect left and right wheels to the lower arm,
- a stud member fastened to a wheel;
- stud forward and rearward moving apparatus to move the stud member; and
- stud movement control apparatus to adjust for a tilted state of the vehicle, the stud movement control apparatus comprises a hydraulic circuit, and the hydraulic circuit adjusts pressure of fluid charged in the front and rear cylinders to control movement of the stud members, wherein the hydraulic circuit comprises:
- a master cylinder divided by a partition into a first control cylinder chamber and a second control cylinder chamber;
- a master piston member having a master piston rod which extends through the partition of the master cylinder and master pistons which are formed on both ends of the master piston rod to be moved on inner surfaces of the first and second control cylinder chambers;
- a fluid reservoir tank connected to the master cylinder and storing fluid which is to be discharged from and supplied to the master cylinder;
- a fluid supply path for supplying fluid stored in the fluid reservoir tank to the master cylinder;
- a fluid discharge path for discharging fluid from the master cylinder to the fluid reservoir tank;
- a first fluid supply and discharge path selectively connected to the fluid supply path or the fluid discharge path and connected to a front control cylinder of the master cylinder to supply or discharge fluid into or from the first control cylinder chamber;
- a second fluid supply and discharge path selectively connected to the fluid supply path or the fluid discharge path and connected to a rear control cylinder of the master cylinder to supply or discharge fluid into or from the second control cylinder chamber;
- a fluid path change valve installed on the first and second fluid supply and discharge paths, having fluid connection paths for selectively connecting the first and second fluid supply and discharge paths to the fluid supply path and the fluid discharge path; and
- an ECU including a sensor unit for sensing a tilted state of the vehicle to control the fluid path change valve in response to a signal from the sensor unit and to thereby selectively connect the first and second fluid supply and discharge paths to the fluid supply path and the fluid discharge path.

8. The caster control apparatus of claim 7 wherein each stud forward and rearward moving apparatus comprises:
- front and rear cylinders;
- a front piston member inserted into a front cylinder, and having a piston which is formed on a distal end thereof to be moved on an inner surface of the front cylinder; and
- a rear piston member inserted into a rear cylinder.

9. The caster control apparatus of claim 7 wherein the sensor unit of the ECU comprises:
- a tilt sensor mounted to a vehicle body to sense a leftward or rightward tilt of the vehicle body;
- a steering angle sensor mounted to a steering system to sense a straight driving direction of the vehicle; and
- a neutral switch sensor mounted to the master piston member to sense whether the master piston member is in a neutral position.

10. A motor vehicle comprising a caster control apparatus of claim 7.

* * * * *